Dec. 23, 1924.
R. C. ALDEN ET AL
1,520,047
DEVICE FOR OPERATING CANDY KETTLES
Filed July 14, 1923
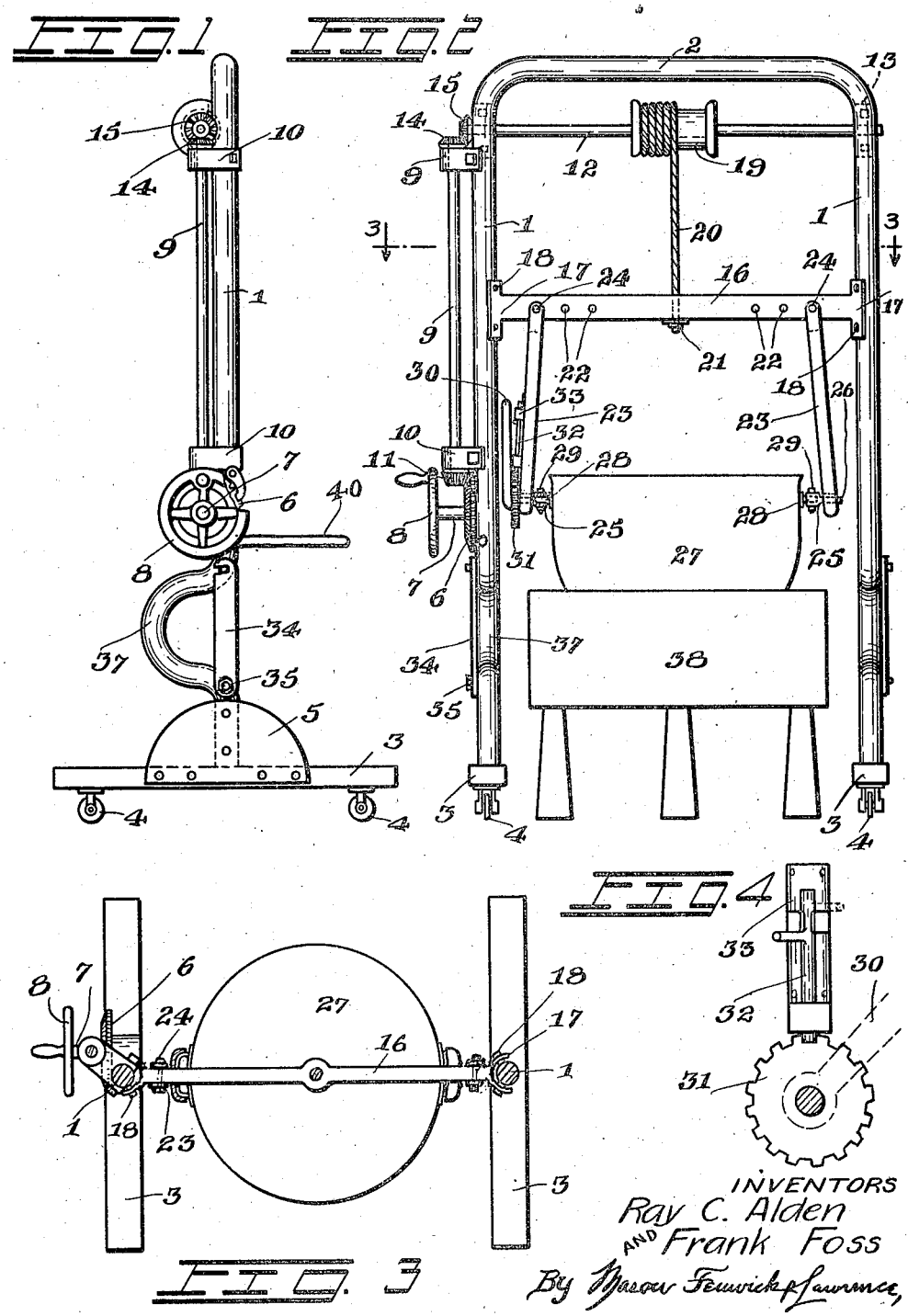
INVENTORS
Ray C. Alden
AND Frank Foss
By Mason Fenwick & Lawrence,
ATTORNEYS Patented Dec. 23, 1924.

1,520,047

UNITED STATES PATENT OFFICE.

RAY C. ALDEN AND FRANK FOSS, OF SEATTLE, WASHINGTON.

DEVICE FOR OPERATING CANDY KETTLES.

Application filed July 14, 1923. Serial No. 651,606.

*To all whom it may concern:*

Be it known that we, RAY C. ALDEN and FRANK FOSS, both citizens of the United States, residing at Seattle, in the county of King and State of Washington, have invented certain new and useful Improvements in Devices for Operating Candy Kettles; and we do hereby declare the following to be a full, clear, and exact description of the invention, such as will enable others skilled in the art to which it appertains to make and use the same.

This invention relates to improvements in devices for operating candy kettles and more particularly to such a device which would be adapted to raise and lower a kettle from its heating furnace and for moving the same to a suitable cooling table or slab where the candy will be poured from the kettle.

An object of the invention is to provide a suitable device which will be operated by one man, which will be adapted to lift a kettle of candy after the same has been cooked from its heating furnace, the said device being mounted on rollers or wheels whereby the kettle may be moved to a cooling table or slab and said device being further provided with suitable means whereby the kettle may be tilted and held in a desired position until all of the candy has been drained therefrom on to the said table or slab.

In the making of certain varities of hard candies it is essential that the ingredients be cooked to a certain degree and immediately poured from the kettle on to a cooling slab or table before the mass has a chance to appreciably cool. It is an object of this invention to provide suitable means whereby the candy may be removed from the cooking furnace, transported to the cooling slab or table and poured from the kettle without delay.

Other objects will appear as the description proceeds.

In the accompanying drawings which form a part of our application,

Fig. 1 is a side elevation of our improved invention;

Fig. 2 is a front elevation of the same;

Fig. 3 is a sectional view taken on line 3—3 of Fig. 2, and

Fig. 4 is a detailed view of the latch mechanism for holding the kettle at the desired angle.

Like characters of reference are used throughout the following specification and the accompanying drawings to designate corresponding parts.

An inverted U-shaped frame is provided with side rods or members 1 which are connected together by means of the rod 2, which is formed integrally therewith. The lower ends of the rods 1 are attached to the base members 3, which are in turn provided at their forward and rear ends with the castors or rollers 4; reinforcing plates 5 are positioned at the side of the base members 3 and are attached thereon and to the side rods 1 and serve to strengthen the same.

A bevel gear wheel 6 is rotatably mounted at the side of one of the rods 1 on a shaft 7. An operating wheel 8 is attached to the shaft 7 so that the rotation of the same will cause the rotation of the gear wheel 6. A vertically extending shaft 9 is mounted in the bracket members 10 on one of the side rods 1 and extends parallel with said side member. A bevel gear 11 is mounted on the lower end of the said shaft 9 and is adapted to intermesh with the bevel gear 6. The shaft 7 is mounted transversely between the side rods 1 and extends parallel with the rod 2. Brackets 13 are attached to the upper ends of the side members 1 and support the said shaft 12. Bevel gear wheels 14 and 15 are mounted on the ends of the shafts 9 and 12, respectively, and intermesh one with the other.

A cross rod 16 is provided with yokes 17 at its opposite ends, which carry suitable rollers 18, which are adapted to contact with the surface of the side rods 1.

A pulley wheel or spool 19 is made fast to the shaft 12 and has attached thereon a cable 20, the free end of which is adapted to pass through the center portion of the cross rod 16 and to be held in position by means of the fastening means 21.

The cross rod 16 is provided with a plurality of openings 22. Downwardly extending arms 23 are adapted to be attached to the cross rod by means of pins 24, which extend through said arms and through the openings in said cross rod. The lower ends of said rods are provided with suitable gripping means which comprise jaw members 25, which have laterally extending studs or portions 26, which portions are adapted to be engaged and suitably held by the lower ends of said arms 23.

The cooking kettle 27 is provided with the usual form of oppositely disposed handles 28, which are adapted to be gripped by the jaw members 25 and pins 29 slipped through said jaw members and handles to securely lock the same in place. An operating lever 30 is attached to one of the studs 26 and carries or supports a sprocket wheel 31, which extends in substantially the same plane therewith. A sliding bolt 32 is retained in a keeper 33 on one of the arms 23 and is adapted to be pushed into or out of engagement with one of the notches of the sprocket wheel 31 so that it is possible to tilt the kettle 27 by simply retracting the bolt and forcing down on the operating lever 30 until the desired angle is secured, whereupon the bolt is allowed to drop down into engagement with the sprocket wheel, thereby locking the kettle from movement. Suitable bracing arms 34 are pivotally mounted at 35 to the standards or side rods 1 and are adapted to be swung up into position over the pin 36 at the opposite side of the U-shaped portions 37 of the said side rods. The function of these bracing arms is to strengthen the construction so that when a heavy kettle filled with cooked candy is removed from the furnace 38 the bolt or U-shaped portions 37 of the side rods will not give. The object of the bolt portions or U-shaped portions is to adapt the device to use on a table that is against the wall, that is the body portion will pass over the edge of the table so that the kettle will be in the correct position for pouring the candy therefrom.

Assuming that the kettle 27 was in position on the furnace 38 and the candy in said kettle was ready to be poured, the operation would be as follows:

A single operator will grasp the device by the rod 40 and wheel the same over until it straddles the furnace 38 and will unwind the operating wheel until the cross rod supporting the arms 23 is lowered in position so that the jaw members 25 will engage the handles 28 of the kettle 27. The operating wheel is then revolved in the opposite direction until the kettle is elevated above the furnace, whereupon the whole device with the kettle will be pushed over the cooking table or slab. The operator will then disengage the sliding bolt from the sprocket wheel 31 and will push down on the operating lever 30 thereby tilting the kettle the desired amount after which the sliding bolt will be released and it will drop into one of the notches in the said wheel 31 thereby holding the kettle at the desired angle.

It will be apparent from the foregoing description that we have designed and invented a complete and efficient type of device for handling candy kettles, and it will be understood that we do not intend to limit ourselves to the specific construction and arrangement of parts as described and illustrated, for many minor changes in detail of construction may be resorted to without departure from the spirit of the invention.

Having thus described our invention what we claim as new and desire to secure by Letters Patent of the United States is:

In a device for lifting and moving candy kettles the combination of a pair of spaced bases, rollers mounted on said bases, a frame carried by said bases, a shaft revolubly mounted across the top of said frame, a cross bar slidably mounted below said shaft and friction rollers carried at opposite ends of said cross bar and adapted to engage the walls of said frame, adjustably pivoted arms attached to said cross bar, jaw members carried at the lower ends of said arms adapted to engage and grip the handles of a kettle, means for raising and lowering said cross bar, means for tilting said kettle and means for holding said kettle in adjusted position.

In testimony whereof we affix our signatures.

RAY C. ALDEN.
FRANK FOSS.